United States Patent
Hallengren

(10) Patent No.: US 7,765,210 B2
(45) Date of Patent: Jul. 27, 2010

(54) METHOD FOR CONSOLIDATING DATA RECORDS

(75) Inventor: Andreas Hallengren, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 122 days.

(21) Appl. No.: 11/646,577

(22) Filed: Dec. 28, 2006

(65) Prior Publication Data

US 2007/0185918 A1  Aug. 9, 2007

(30) Foreign Application Priority Data

Dec. 29, 2005  (EP) .................... 05028641

(51) Int. Cl.
*G06F 17/30* (2006.01)
(52) U.S. Cl. .................... 707/736; 370/389
(58) Field of Classification Search ........... 707/203; 379/126; 370/369
See application file for complete search history.

(56) References Cited

U.S. PATENT DOCUMENTS

| | | | |
|---|---|---|---|
| 6,567,377 B1 | 5/2003 | Vepa et al. | |
| 6,920,208 B1 * | 7/2005 | Rosen et al. | 379/126 |
| 7,656,868 B2 * | 2/2010 | Jonsson | 370/389 |
| 2002/0033416 A1 * | 3/2002 | Gerszberg et al. | 235/380 |
| 2003/0145106 A1 | 7/2003 | Brown | |
| 2008/0137653 A1 * | 6/2008 | Jonsson | 370/389 |

FOREIGN PATENT DOCUMENTS

WO  99/38302 A1  7/1999

* cited by examiner

*Primary Examiner*—Don Wong
*Assistant Examiner*—Sheree N Brown
(74) *Attorney, Agent, or Firm*—Nixon & Vanderhye P.C.

(57) ABSTRACT

A method for operating a computer system (100) to consolidate data records received from at least one network element (NE1, NE2) in consolidation node (200), wherein incoming data records are distributed to different links (L1, L2, L3) in the consolidation node (200) by routing the data to be processed in sub-flows (201,202,203), data to be consolidated is routed to the same sub-flow, and the data records of the respective sub-flows are consolidated in parallel.

14 Claims, 6 Drawing Sheets

METHOD FOR CONSOLIDATING DATA RECORDS

This application is a U.S. utility application claiming priority to EP 05028641-8 filed 29 Dec. 2005, the entire content of which is hereby incorporated by reference.

TECHNICAL FIELD OF THE INVENTION

The present disclosure relates to a method for operating a computer system to consolidate data records in a consolidation node, and more particularly to a method for operating a computer system to consolidate data records received from two or more network elements into a common consolidated data record.

DESCRIPTION OF RELATED ART

The combination of charging data, referred to as Data Records (DRs), generated from the same initiating source in different points in time in telecommunication networks is generally referred to as correlation of data. The combination of data generated from different initiating sources and/or in different points in time is referred to as consolidation of DRs.

Both correlation and consolidation are ways of combining several incoming/collected DRs into one outgoing/distributed DR. These are both central and important functions in a mediation solution, and often referred to as functions that a mediation solution may offer according to different standardizations.

A key that uniquely identifies that two or more incoming records result from the same long duration call, or session is required in order to consolidate DRs. Different combinations of parameters in the incoming DRs are used to generate this key depending on which the initiating sources are.

Further, the consolidation function is based on the concept of retaining a pool of unconsolidated, and partially consolidated DRs in a so-called consolidation table. Each stored record/entity in the consolidation table has an associated unique key. Every new incoming DR is then checked against the consolidation table for possible matches. This key is used when performing various operations on the table, for example search or remove. Typically, the DR entries in the consolidation table are updated (summed up) with a duration for long duration voice calls or a volume for long data sessions.

A mediation system creates advantages for operators by improving marketing capabilities, cost efficiency and financial risk management.

A mediation system provides one central point, placed between the communication and business support networks, for collection, processing and distribution of charging information. The overall aim of a mediation system is to support quick and smooth introduction of services into the communication network by providing a single point for charging related information. Mediation systems enables operators to charge for any service based on any metrics, online or offline. Mediation systems are network technology independent; they support access from wireline or mobile networks, from GSM, WCDMA, CDMA2000 and IMS networks.

A problem with prior art implementations of the consolidation function is that it is seen as a bottleneck in Mediation Systems (MM).

The nature of the consolidation task as such means that it needs to be ran sequentially, while the remaining parts of the processing flows, without consolidation nodes, can be ran in parallel and take advantage of multi process and multi threaded software architecture.

When a file is collected in MM, the DRs are sent in to the consolidation function one by one and the consolidation table is searched for matches. A performance limiting factor is when several source nodes are connected to the same consolidation node, wherein only one source node at a time has access to the consolidation function. The consolidation task needs to be performed sequentially and how fast the searches of the consolidation table can be performed impacts the performance.

The reason why the consolidation task as such needs to be performed sequentially is that it is required that no data is lost, or even worse, duplicated while being processed in MM.

In processing flows including consolidation nodes, it is no use to allocate more than one process and one thread per process, because the consolidation task as such needs to be performed sequentially. Hence, if more processes and threads are allocated, which at the same time can not be utilised, this will only result in overhead, and waste of system resources.

SUMMARY

According to one or more non-limiting embodiments, a method for operating a computer system to consolidate data records received from two or more network elements in a common consolidation node, comprises:

distributing incoming data records to different links in the consolidation node by routing the data to be processed in sub-flows, wherein data from the same network entity is routed to the same sub-flow, and consolidating the data records of the sub-flows in parallel.

According to a non-limiting embodiment the data records of each of said sub-flows are compared to data records stored in a pool of unconsolidated records for each sub-flow based on a key.

According to a non-limiting embodiment the routing is based on the e.g. last digit in the MSISDN (Mobile Station International ISDN Number) for the network elements.

According to a non-limiting embodiment one process and one thread per process is allocated for each sub-flow.

According to a non-limiting embodiment a computer program comprises instructions for causing a computer to perform the process of the method according to the embodiments of the invention.

According to a non-limiting embodiment the computer program may be embodied on a record medium, stored in a computer memory, embodied on a read-only memory, or carried on an electrical carrier signal.

According to a non-limiting embodiment the computer program product may comprise a computer readable medium, having thereon: computer program code means, when said program is loaded, to make the computer execute the process of the method according to the embodiments of the invention.

BRIEF DESCRIPTION OF THE DRAWINGS

In order to explain the non-limiting aspects of the invention in more detail and the advantages and features thereof, preferred embodiments will be described in detail below, reference being made to the accompanying drawings, in which.

DETAILED DESCRIPTION

Figure 1:
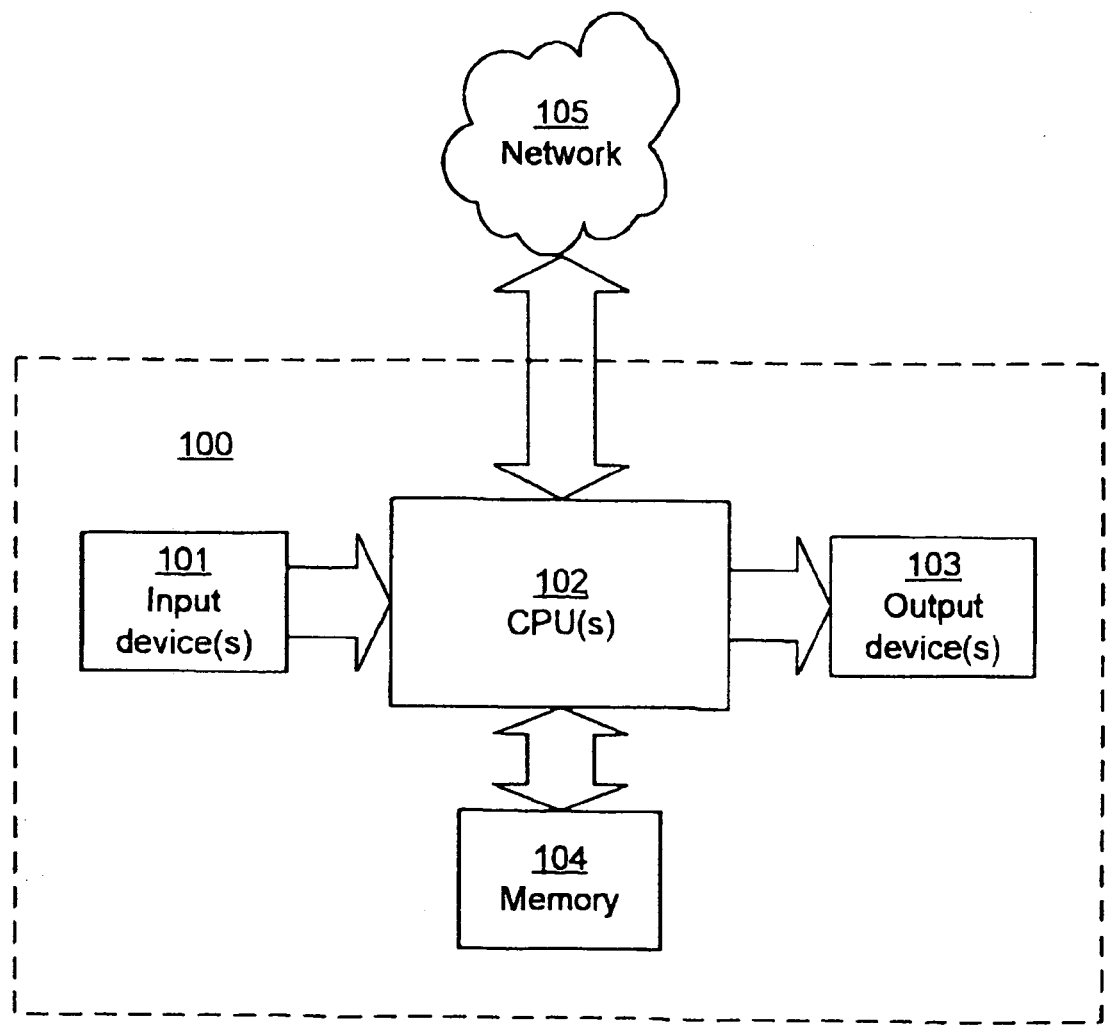
FIG. 1 shows a computer system for consolidation of data records in parallel according to a non-limiting embodiment of the invention.

FIG. 1 shows a computer system 100 for combining several incoming data records DRs into one outgoing/distributed data record DR by consolidation of data records in parallel according to a non-limiting embodiment. The computer system 100 is an electronic device capable of interpreting and executing programmed commands for input, output, computation, and logic operations, and the computer system is intended to be used in a telecommunications network. The computer system 100 may comprise, but is not limited to, one or more input devices 101, central processing units 102, output devices 103, and one or more internal or external storage devices 104, all of which are interconnected. The computer system 100 may be adapted to communicate with a communications network 105.

The combination of charging data, referred to as Data Records (DRs), generated from the same initiating source in different points in time in telecommunication networks, is sometimes referred to as correlation of data. The combination of data generated from different initiating sources and/or in different points in time is sometimes referred to as consolidation of DRs. Also, these terms are sometimes used to encompass both aspects. In the following, the term consolidation is used in a broader sense meaning to combine DRs independently of whether they come from the same source or not.

Further, a non-limiting example consolidation function is based on the concept of retaining a pool of unconsolidated and partially consolidated DRs in a so-called consolidation table. Each stored DR has an associated unique key. Every new incoming DR is then checked against the consolidation table for possible matches. This key is used when performing various operations on the table, for example search or remove. Typically, the DR entries in the consolidation table are updated (summed up) with a duration for long duration voice calls or a volume for long data sessions.

FIG. 2 shows a consolidation node 200 implemented on the computer system 100 to perform a consolidation function in accordance with the one or more non-limiting aspects of the present invention.

An example non-limiting aspect is based on that the consolidation is performed in parallel, even though it is still performed sequentially for each part of a collected file. That is, each incoming charging data file or data flow needs to be routed into different sub-flows, illustrated as parallel blocks 201, 202, and 203 in FIG. 2, in a way that all data to be consolidated, for example belonging to the same long duration call or session, ends up in the same sub-part of the consolidation flow. Moreover, the processing is split, more or less by writing and reading the data to/from the data storage 104 before the consolidation task as such is performed. This is done in order to take advantage of parallel processing in a processing flow, before entering the consolidation node 200, i.e several processes and threads per process are possible to allocate to these flows.

In order to obtain parallel processing of data records it is required to identify and choose a parameter to route the data on. The parameter, or discriminator, needs to be chosen in such a way that data records to be consolidated are guaranteed to be routed to the same sub-flow. Examples of various discriminators that may be used are IP address, IMSI, MSISDN, email address, Session Initiated Protocol (SIP) address.

DRs to be consolidated may be those belonging to the same subscriber and same call but it could also be for other reasons. In one possible scenario data from different users during a conference call or a IP Multimedia System (IMS) session needs to be consolidated to provide a single cost on for example a company subscription. In another scenario all DRs originating from an on-line game session need to be consolidated. In yet another scenario DRs relating to a multimedia session that has been handed over from a cellular (e.g. WCDMA/GSM) access to a Wireless Local Area Network (WLAN) access, potentially involving a terminal change, need to be consolidated.

It is necessary that the parameter uniquely identifies the subscriber in the charging data from all the different nodes connected to the consolidation node.

The routing may for example be based on the last digit in the MSISDN (Mobile Station International ISDN Number). This means that all data from the same subscriber will always end up in the same sub-consolidation flow.

Both the logic for routing the flows, and process/thread allocation may be built-in in the consolidation node 200. This means that, the user of MM should be able to choose: which parameter the routing should be based on, for example, the last digit in the MSISDN as mentioned above; and how many sub-flows the user of MM would like to route the consolidation node into.

One process and one thread per process will automatically be allocated for each sub-flow of the consolidation node.

FIG. 2 is an illustrative view of how it might look internally in the consolidation node 200. Charging data is coming into the consolidation node 200 via an input interface 204, for example from the network 105 in FIG. 1. The router 205 routes the incoming data to three different links L1, L2, and L3, in this embodiment, by routing the data to be processed in the three sub-flows 201, 202, and 203, e.g. with a part of the MSISDN number as a key. The MSISDN (Mobile Subscriber ISDN (MSISDN) Number) is the dialable number that callers use to reach a mobile subscriber:

Link 1: MSIDN ending with 0, 1, 2, 3
Link 2: MSIDN ending with 4, 5, 6
Link 3; MSIDN ending with 7, 8, 9

Hence, the flow is routed before the consolidation task is performed. Each flow has then its own pool of unconsolidated records. For each sub-flow one process and one thread per process is allocated.

Figure 2A:
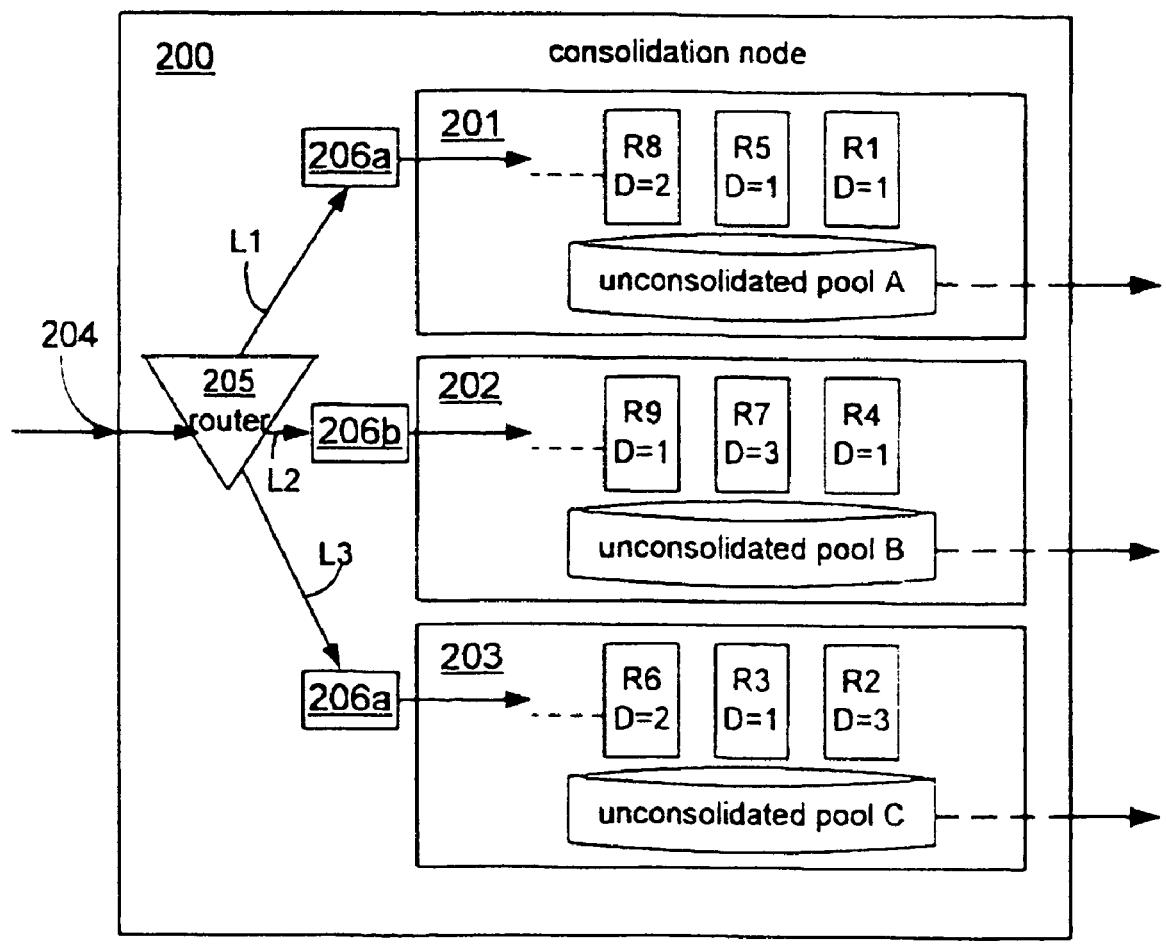
FIG. 2A illustrates a non-limiting embodiment of a consolidation node implemented on the computer system of FIG. 1 to perform a consolidation function.
Figure 2B:
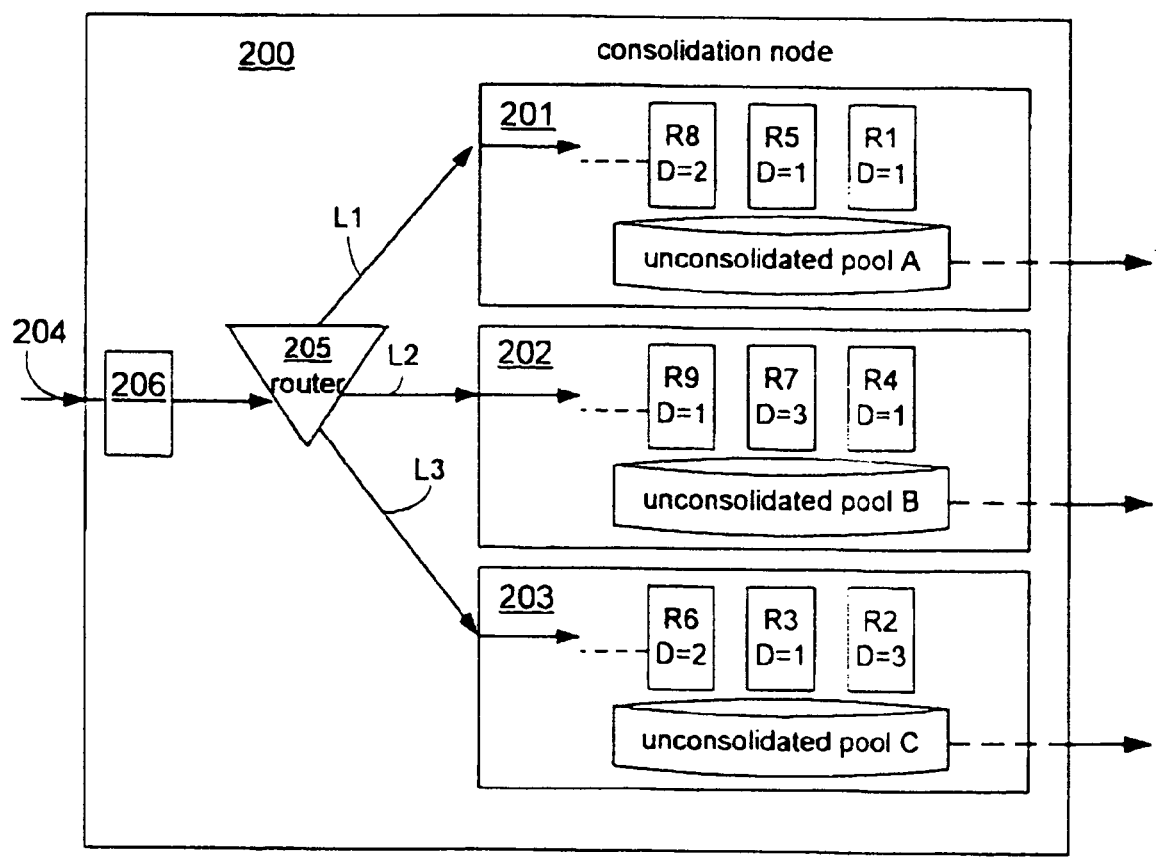
FIG. 2B illustrates another non-limiting embodiment of a consolidation node implemented on the computer system of FIG. 1 to perform a consolidation function.

With reference to the embodiment in FIG. 2A, the flow of incoming data records is split by means of a splitter 206a, 206b, and 206c, one for each sub-flow 202, 202, and 203, after the router 205 but before incoming data is consolidated. However, with reference to an alternative embodiment as shown in FIG. 2B, the flow of incoming data records is split by means of a splitter 206 before incoming data is distributed by the router 205.

Figure 3A:
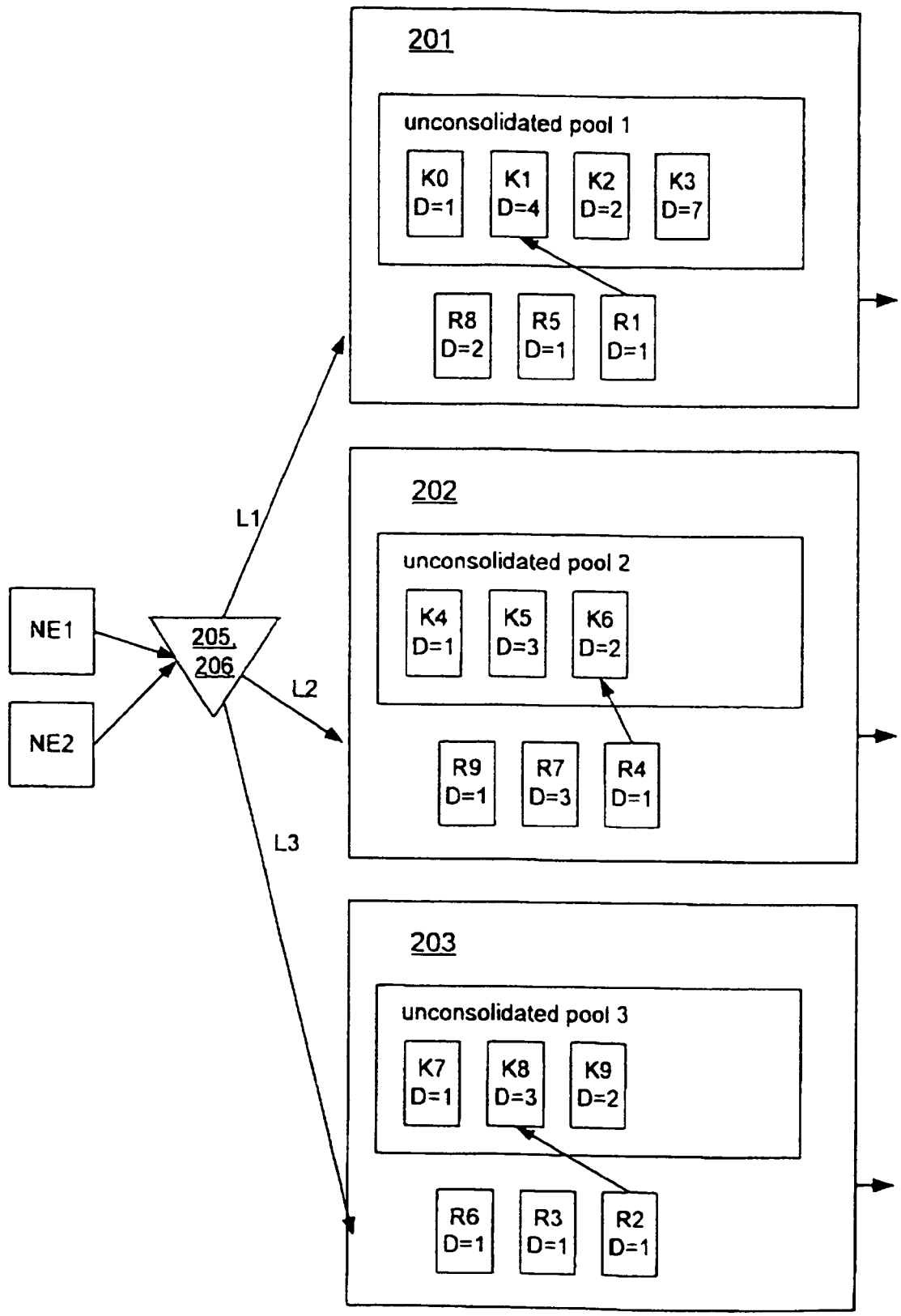
FIGS. 3A-3C illustrate a non-limiting example method for consolidation.
Figure 3B:
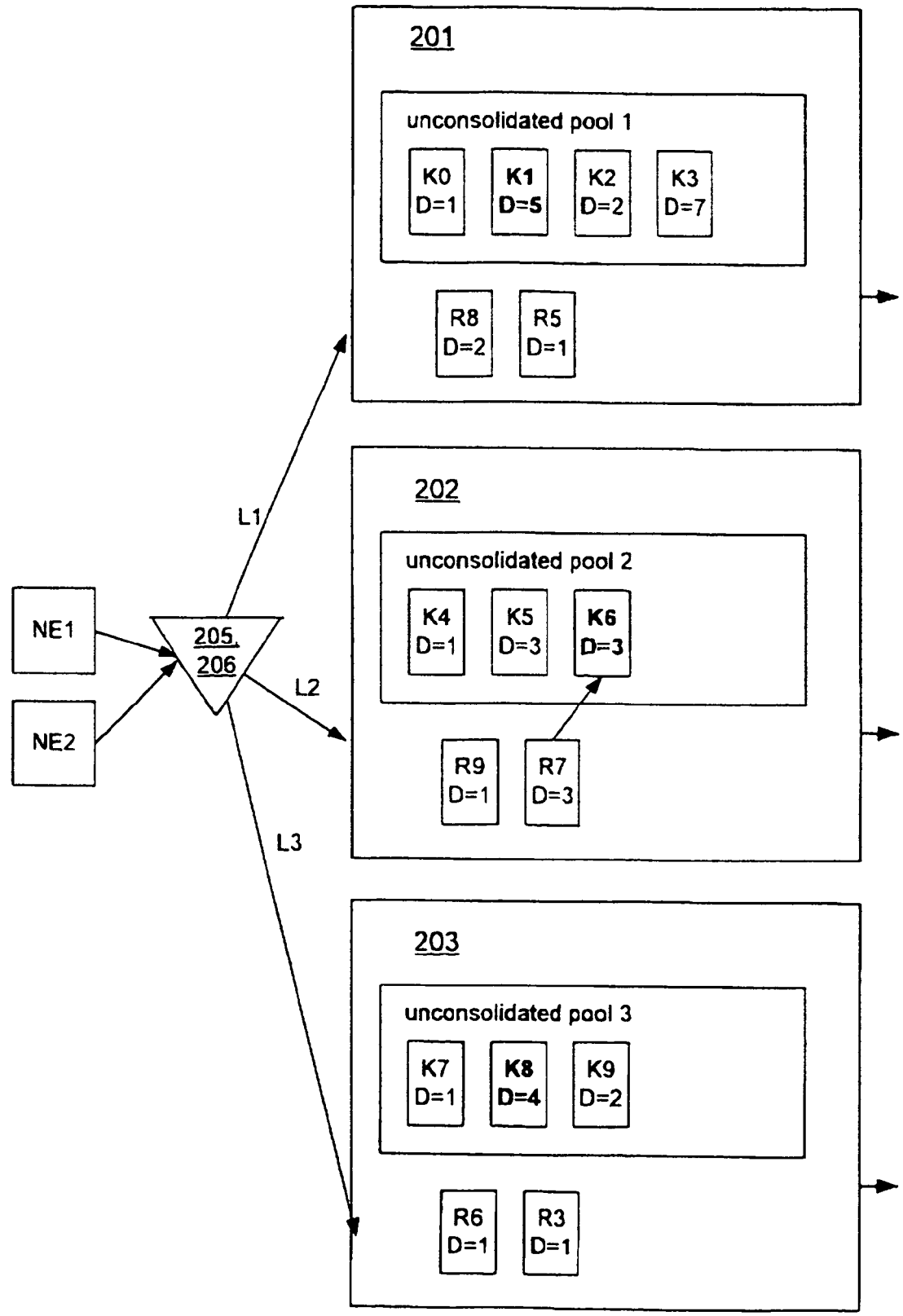
Figure 3C:
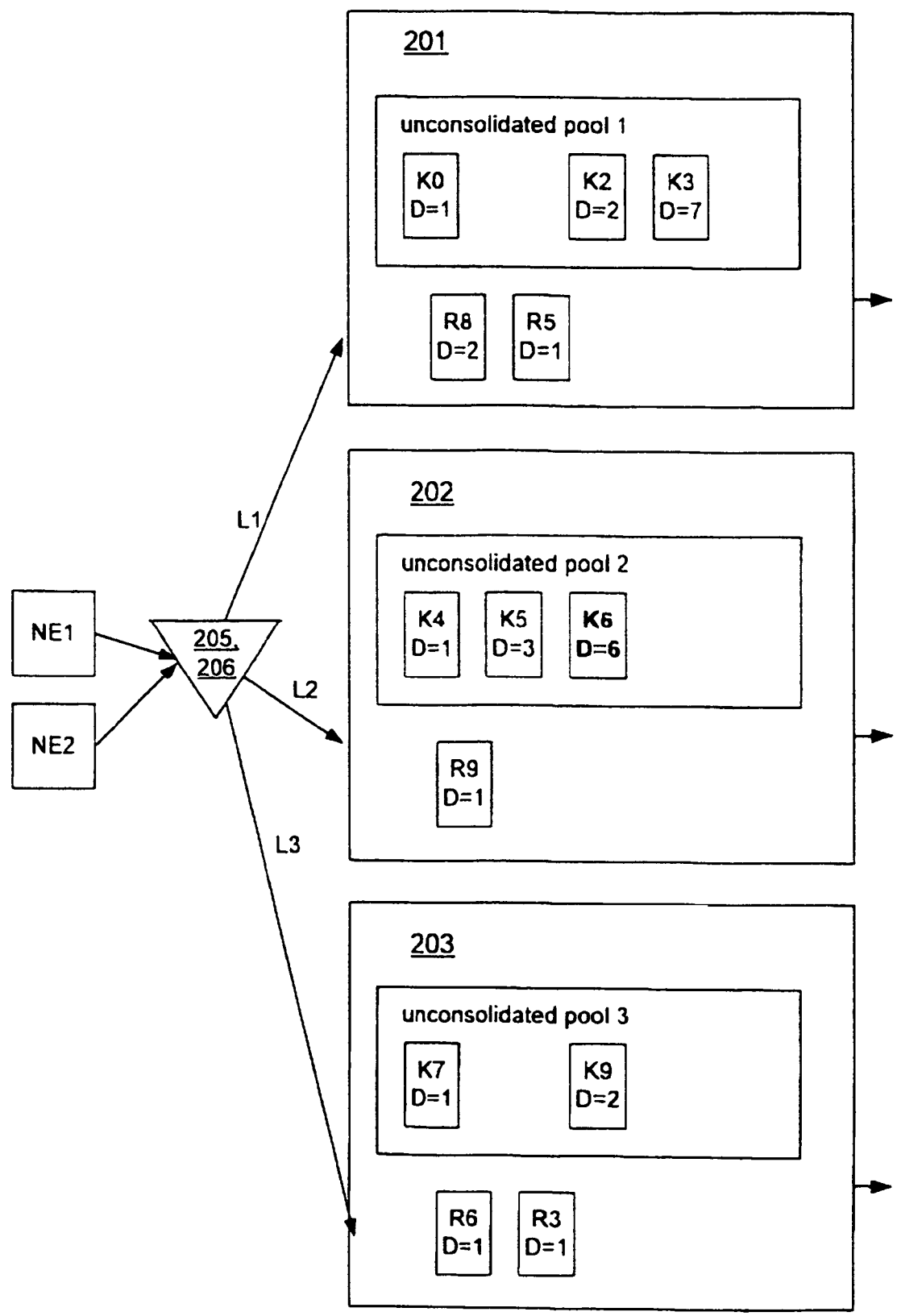

With reference to FIGS. 3A-3C, records R1-R9 are received from two network elements, NE1 and NE2. The records R1-R9 are routed to the three different sub-flows 201, 202, and 203, based on ten different keys K0-K9, i.e MSISDN ending with 0-9 in this example embodiment. Hence, data records R matching any of the keys K0-K3 will be routed to the sub-flow 201, data records R matching any of the keys K4-K6 may be routed to the sub-flow 202, and data records R matching any of the keys K7-K9 may be routed to the sub-flow 203. The records R for each pool may be compared to the data records which are already stored in that pool of unconsolidated records based on any of the keys valid for that pool.

With reference to FIG. 3A, a data record R1 finds a match in the unconsolidated pool of records with the key K1 in the sub-flow 201. Another data record R4 finds a match in the unconsolidated pool of records with the key K6 in the sub-flow 202. Still another data record R2 finds a match in the unconsolidated pool of records with the key K8 in the sub-flow 203. All these three matches may take place in parallel.

In a next step the record in the pool of unconsolidated records in the sub-flow 201 with K1 is summed up to D=5, as shown in FIG. 3B. The record in the pool of unconsolidated records in the sub-flow 202 with K6 is summed up to D=3 in the same way. Also the record in the pool of unconsolidated records in the sub-flow 203 with K8 is summed up to D=4. These summations may also take place in parallel.

No more matches are found for K1 in the sub-flow 201 or K8 in the sub-flow 203. Thereby, matches for these two calls are completed and may be sent out for further processing as shown in FIG. 3C. However, another match is found for the record R7 in the pool or unconsolidated records in the sub-flow 202 with K6 which is summed up to D=6, as shown in FIG. 3C.

Processing is enabled in parallel for sub-flows including consolidation. However, since one process and one thread per process is allocated, the same record-match may not take place simultaneously in a single sub-flow in a pool of unconsolidated records. Hence, no duration D may been lost during the consolidation task.

At least one non-limiting embodiment enable processing in parallel also for processing flows including correlation and consolidation.

An advantage of one or more embodiments of the present invention may be a secure way of handling the charging data despite that parallelism is introduced for the consolidation task as such.

Another issue that might be considered is to concatenate the sub-flows into one single flow, before the data is distributed from the consolidation node.

Although the embodiments described with reference to the drawings thus far comprise a computer apparatus and processes performed in the computer apparatus, the invention aspects also extend to programs on or in a carrier, adapted for putting the aspects into practice. The program may be in the form of source code, object code a code suitable for use in the implementation of the method(s) according to the aspects of the invention. The carrier can be any entity or device capable of carrying the program. For example the carrier may be a record medium, computer memory, read-only memory or an electrical carrier signal.

The invention claimed is:

1. A method for operating a computer system to consolidate data records received from at least one network element in a consolidation node, the method comprising:
the consolidation node distributing incoming data records to different links in the consolidation node by routing the incoming data records in at least two sub-flows, wherein a plurality of the incoming data records relating to a first session/call are associated with a first key and routed to a first sub-flow of the at least two sub-flows, and a plurality of the incoming data records relating to a second session/call are associated with a second key and routed to a second sub-flow of the at least two sub-flows such that the plurality of the incoming data records relating to the first session/call are routed to the plurality of the incoming data records relating to the second session/call are routed to the second sub-flow;
the consolidation node splitting the at least two sub-flows of the incoming data records; and
the consolidation node consolidating the incoming data records of the at least two sub-flows in parallel, wherein the plurality of the incoming data records relating to the first session/call are consolidated and the plurality of the incoming data records relating to the second session/call are consolidated.

2. The method according to claim 1, further comprising the consolidation node receiving the incoming data records from two or more network elements.

3. The method according to claim 1, wherein, before the step of distributing the incoming data records, the step of splitting the flow of the incoming data records is performed.

4. The method according to claim 1, wherein the incoming data records of each of the at least two sub-flows are compared to data records stored in a pool of unconsolidated data records for each sub-flow based on a key.

5. The method according to claim 1, wherein the routing is based on any one or more of an IP address, an IMSI, a MSISDN (Mobile Station International ISDN Number), an email address, and a Session Initiated Protocol (SIP) address for the network elements.

6. The method according to claim 1, wherein one process is allocated for each sub-flow.

7. A computer program product comprising a computer readable medium, having recorded thereon a computer program code, when the program code is loaded, to make a computer execute the method of claim 1.

8. A consolidation node in a telecommunications network structured to consolidate data records received from at least one network element of the telecommunications network, the consolidation node comprising:
a router structured to distribute incoming data records to different links in the consolidation node by routing the incoming data records to at least first and second sub-flows, wherein each incoming data record relating to a first or second session/call is respectively associated with a first or a second key and is respectively routed to the first or the second sub-flow such that a plurality of the incoming data records relating to the first session/call are routed to the first sub-flow and a plurality of the incoming data records relating to the second session/call are routed to the second sub-flow;
a splitter structured to split an incoming flow of the incoming data records into at least the first and second sub-flows; and
a consolidator structured to consolidate in parallel the incoming data records routed to the first and second sub-flows, the consolidator consolidating the incoming data records relating to a same session/call within each sub-flow.

9. The node according to claim 8, further comprising one or more input devices structured to receive the incoming data records from two or more network elements.

10. The node according to claim 8, wherein the splitter is structured to split the incoming flow prior to the router distributing the incoming data records.

11. The node according to claim 8, wherein the consolidator is structured to compare the incoming data records of each of the first and second sub-flows to data records stored in a pool of unconsolidated data records for each sub-flow based on a key associated with each incoming data record.

12. The node according to claim 11, wherein the consolidator is structured to compare the incoming data records one at a time within each of the first and second sub-flows.

13. The node according to claim 8, wherein the router is structured to route the incoming data flows based on any one or more of an IP address, an IMSI, a MSISDN (Mobile Station International ISDN Number), an email address, and a Session Initiated Protocol (SIP) address for the network elements.

14. The node according to claim 8, wherein the consolidation node is a computer and the first and second sub-flows are respectively implemented as first and second processes of the computer such that the first process is allocated only a first thread and the second process is allocated only a second thread.

* * * * *

UNITED STATES PATENT AND TRADEMARK OFFICE
CERTIFICATE OF CORRECTION

| | | |
|---|---|---|
| PATENT NO. | : 7,765,210 B2 | Page 1 of 1 |
| APPLICATION NO. | : 11/646577 | |
| DATED | : July 27, 2010 | |
| INVENTOR(S) | : Hallengren | |

It is certified that error appears in the above-identified patent and that said Letters Patent is hereby corrected as shown below:

In Column 1, Line 8, after "FIELD" delete "OF THE INVENTION".

In Column 2, Lines 63-64, delete "embodiment of the invention;" and insert -- embodiment; --, therefor.

In Column 3, Line 46, after "with" delete "the".

In Column 4, Line 43, delete "3;" and insert -- 3: --, therefor.

In Column 5, Line 19, delete "or" and insert -- of --, therefor.

In Column 5, Line 63, in Claim 1, after "routed to the", insert -- first sub-flow and the --.

Signed and Sealed this
Eleventh Day of October, 2011

David J. Kappos
*Director of the United States Patent and Trademark Office*